US008680408B2

(12) United States Patent
Tanaka

(10) Patent No.: US 8,680,408 B2
(45) Date of Patent: Mar. 25, 2014

(54) ELECTRONIC SCALE FOR MEASURING WEIGHT USING TWO MEASUREMENTS AND A PROCESSOR THEREFOR

(75) Inventor: Masahide Tanaka, Osaka (JP)

(73) Assignee: NL Giken Incorporated, Osaka (JP)

( * ) Notice: Subject to any disclaimer, the term of this patent is extended or adjusted under 35 U.S.C. 154(b) by 492 days.

(21) Appl. No.: 12/576,245

(22) Filed: Oct. 9, 2009

(65) Prior Publication Data

US 2010/0089665 A1 Apr. 15, 2010

(30) Foreign Application Priority Data

Oct. 11, 2008 (JP) .................................. 2008-264698

(51) Int. Cl.
  *G01G 19/44* (2006.01)
  *A61B 5/00* (2006.01)
  *H03M 1/18* (2006.01)

(52) U.S. Cl.
  USPC ..................... 177/25.13; 600/300; 128/921

(58) Field of Classification Search
  USPC ......... 177/25.13–25.17, 25.19, 177; 128/921; 600/300
  See application file for complete search history.

(56) References Cited

U.S. PATENT DOCUMENTS

| | | | | |
|---|---|---|---|---|
| 3,869,004 A | * | 3/1975 | Gallo | 177/25.14 |
| 4,076,088 A | * | 2/1978 | Gallo et al. | 177/210 R |
| 4,149,605 A | * | 4/1979 | Mettler et al. | 177/173 |
| 4,156,472 A | * | 5/1979 | Kunz | 177/25.13 |
| 4,375,243 A | * | 3/1983 | Doll | 177/25.17 |
| 4,632,198 A | * | 12/1986 | Uchimura | 177/211 |
| 4,650,014 A | * | 3/1987 | Oldendorf et al. | 177/177 |
| 4,690,230 A | * | 9/1987 | Uchimura et al. | 177/229 |
| 4,696,359 A | * | 9/1987 | Glibbery | 177/211 |
| 4,706,507 A | * | 11/1987 | D'Angelo | 73/862.08 |
| 4,706,767 A | * | 11/1987 | Chou | 177/50 |
| 4,711,314 A | * | 12/1987 | Suzuki et al. | 177/164 |
| 4,778,016 A | * | 10/1988 | Uchimura et al. | 177/164 |
| 4,842,085 A | * | 6/1989 | Lang | 177/164 |
| 5,174,400 A | * | 12/1992 | Hasegawa et al. | 177/200 |
| 5,190,117 A | * | 3/1993 | Freeman et al. | 177/244 |
| 5,287,748 A | * | 2/1994 | Talmadge | 73/769 |
| 6,617,530 B1 | * | 9/2003 | Lin | 177/25.16 |
| 6,679,854 B2 | * | 1/2004 | Honda et al. | 600/587 |
| 6,886,139 B2 | | 4/2005 | Liu | |
| 7,557,311 B2 | * | 7/2009 | Umemoto | 177/25.16 |
| 7,798,961 B1 | * | 9/2010 | Bakhshandeh | 600/300 |

(Continued)

FOREIGN PATENT DOCUMENTS

| EP | 0278187 | * | 8/1988 | ............. H03M 1/18 |
|---|---|---|---|---|
| JP | 2000-275092 A | | 10/2000 | |

(Continued)

*Primary Examiner* — Randy W Gibson

(57) ABSTRACT

An electronic scale functions in a normal and a high sensitivity measurement regions. The weights of mother alone and mother plus infant are measured in the high sensitivity region. The difference between the two measurements is the weight of infant alone, which is displayed with a finer scale interval than the normal one. The high sensitivity region is automatically shifted for covering the two measurements. The degree of shift is stored to correct the absolute mother weight. The infant weight is transmitted to a mobile phone, which displays growth curve of infant in comparison with a statistics growth curves provided by a server through the internet. The infant weight is uploaded to the server for incorporation into the statistics. The statistics is based on data gathered form a plurality of mobile phones, which are each authenticated to increase reliability of the statistics against false weight data upload.

18 Claims, 6 Drawing Sheets

(56) References Cited

U.S. PATENT DOCUMENTS

| | | | |
|---|---|---|---|
| 2004/0204633 A1* | 10/2004 | Rentea et al. | 600/300 |
| 2005/0113649 A1* | 5/2005 | Bergantino | 600/300 |
| 2006/0015016 A1* | 1/2006 | Thornton | 600/300 |
| 2007/0106127 A1* | 5/2007 | Alman | 600/300 |
| 2007/0179355 A1* | 8/2007 | Rosen | 600/300 |
| 2010/0049471 A1* | 2/2010 | Gage et al. | 702/173 |
| 2011/0021188 A1* | 1/2011 | Tanaka | 455/426.1 |

FOREIGN PATENT DOCUMENTS

| | | | | |
|---|---|---|---|---|
| JP | 2000-285178 A | | 10/2000 | |
| JP | 2003-214938 | * | 7/2003 | ............ G01G 21/16 |
| JP | 2005-106552 A | | 4/2005 | |
| JP | 2005-190387 A | | 7/2005 | |
| JP | 2006-99301 A | | 4/2006 | |
| JP | 2008-57988 A | | 3/2008 | |
| JP | 2008-154855 A | | 7/2008 | |

* cited by examiner

ELECTRONIC SCALE FOR MEASURING WEIGHT USING TWO MEASUREMENTS AND A PROCESSOR THEREFOR

BACKGROUND OF THE INVENTION

1. Field of the Invention

This invention relates to an electronic scale and a processor for the care of weight change.

2. Description of the Related Art

In this field of the art, various attempts have been done with respect to an electronic scale and a processor for the care of weight change. For example, USP discloses an electronic scale for measurement of infant or for diet to a goal, in which a mother who wishes to weigh her baby may step onto the platform, move the position of her feet without stepping off the platform, wait and carefully depress the ON key for the display to blank, and she may have baby placed in her arms for the baby weight display. Japanese Laid-open Patent Application No. 2008-153855 proposes another health care data producing system including an electronic scale and PDA (a personal digital assistant) capable of wireless communication with the electronic scale. Japanese Laid-open Patent Application No. 2008-57988 proposes still another electronic scale in which the scale interval is changed in an automatic response to a degree of fluctuation in a plurality of repeatedly sampled data for a measurement. Further, Japanese Laid-open Patent Application No. 2000-275092 proposes a cost-cut electronic scale having a high sensitivity measurement region only around 50 kg where a finer change is of interest in a diet plan with the sensitivity of other region outside such a high sensitivity measurement region lowered.

On the other hand, U.S. Pat. No. 6,886,139 proposes a portable device which collects information regarding an infant and can manually or automatically configure various remainders for a caregiver to attend to the infant under care. Further, it is disclosed in the USP that an exemplary chart may be displayed on a screen of the device and indicates a graphic comparison between two curves shown age growth horizontal axe and corresponding weight axe, one curve being derived from a set of "norm" and the other curve from the data collected over time from the reminders, with periodical inputs from the caregiver. Japanese Laid-open Patent Application No. 2000-285178 proposes an electronic mother-child notebook having health information linked with a treatment database of a medical institute. Japanese Laid-open Patent Application No. 2005-190387 proposes another electronic mother-child notebook of a card memory type, the data of which is retrieved and displayed in the form of a growth chart on a user terminal by means of a browser provided by a server through the internet.

Another approach is proposed in Japanese Laid-open Patent Application No. 2006-99301 in which data from health measurement equipment is taken into a mobile phone through the infrared communication, which is in turn uploaded to a web site through the internet. The uploaded data is stored and controlled in an individual client file and is capable of being retrieved any time for graphic display at the mobile phone.

However, there still exist in this field of art many demands for improvements of an electronic scale and a processor for the care of weight change.

SUMMARY OF THE INVENTION

An object of this invention is to propose an electronic scale with advantages in use improved.

Another object of this invention is to propose a processor for the care of weight change capable of providing weight information with objectivity improved.

Still another object of this invention is to propose an improved communication between an electronic scale and a processor for the care of weight change.

To achieve one of the above objects, this invention provides an electronic scale for measuring a weight comprising a weight sensor arranged to measure a weight of a load on the weight sensor for producing a measurement output, a memory arranged to store a first measurement output produced by the weight sensor, a controller arranged to calculate a difference weight between the first measurement output and a second measurement output produced by the weight sensor, and a display arranged to display a measurement output with a first scale interval and to display the difference weight with a second scale interval finer than the first scale interval. Thus, the display of absolute measurement output which is to vary in relatively wide dynamic range and the display of the difference is to vary in relatively narrow dynamic range and to require finer information are both adequately displayed.

According to a detailed feature of the invention, the weight sensor is capable of functioning both in a normal region and in a high sensitivity measurement region in which the output of the weight sensor more sensitively changes against the change in the load thereon than in the normal region, wherein the first and second measurement outputs are produced in the high sensitivity measurement region for the display of the difference weight with the second scale interval. Thus, the finer information display is advantageously achieved on the basis of the first and second measurement outputs produced in the high sensitivity measurement region. According to further detailed feature of the invention, the normal region exists on both sides of the high sensitivity measurement region.

According to another detailed feature relating to the above feature, the weight sensor is so arranged that the high sensitivity measurement region is shifted to cover both the first and second measurement outputs. This is advantageous for avoiding a wide high sensitivity measurement region. Even if the high sensitivity measurement region is shifted, the difference between the first and second measurement outputs is relative and is not altered. For easiness of use, the weight sensor may be so arranged that the high sensitivity measurement region is automatically shifted in response to the measurement output.

According to another detailed feature relating the shift of high sensitivity measurement region, the memory is arranged to store the degree of shift of the high sensitivity measurement region to correct the first measurement output into an absolute weight which is free form the shift of the high sensitivity measurement region. Since the shift of high sensitivity measurement region causes the change in the first measurement output, it is necessary to correct the measurement output by the stored degree of shift to recover the absolute weight.

According to a detailed feature of the invention, the first measurement output is for the weight of a mother alone, the second measurement output is for the weight of the mother with an infant in her arms, and the difference weight is for the infant alone. Thus, the weight in a finer unit for the infant alone is displayed in the second scale interval finer than the first scale interval for an adult.

According to a detailed feature of the invention, the electronic scale further comprises a processor for the care of weight change. According to the more detailed feature, the processor is for the care of growth of an infant. Alternatively, the electronic scale may not comprise the processor for the care of weight change by itself, but comprises a communicator arranged to transmit the measured weight information to an outside processor for the care of weight change. A typical example of the outside processor is a mobile phone. Another example of the outside processor is a database arranged to provide statistics information for the care of weight change.

According to another feature of this invention, a processor for the care of weight change in cooperation with an electronic scale for measuring a weight is provided. The processor for the care of weight change comprises first communicator arranged to receive weight information from the electronic scale, a second communicator arranged to receive statistics information for the care of weight change from an outside database, a memory arranged to store the weight information received by the first communicator and the statistics information received by the second communication, and a display arranged to retrieve the weight information and the statistics information from the memory for displaying them in a comparative manner. According to this feature, the weight information which is subjectively originated by one electronic scale can be compared with statistics information for the care of weight change which is objectively received from an outside database.

According to a detailed feature of the invention above, the weight information is for an infant and the outside database is for the care of growth of infants, and wherein the display is arranged to display the weight information and the statistics information in the form of comparative growth curves in the growth chart. Thus, the comparison of the subjective and objective information is carried out in accordance with the common graphic format.

According to another detailed feature of the invention above, the processor further comprises a third communicator arranged to transmit the weight information to the outside database, wherein the transmitted weight information is incorporated into the statistics information received from the outside database. Thus, the subjective weight information can participate in the objective statistics information. In a typical example of the above detailed feature, the processor is a mobile phone, and wherein the second and third communicators are the phone line.

According to another feature of this invention, a processor for the care of weight change with a database in cooperation with a plurality of mobile phones is provided. The processor for the care of weight change comprises a first communicator arranged to receive weight information from a plurality of the mobile phones, a memory arranged to store the weight information received by the first communicator, a processing unit arranged to process the weight information in the memory with the received weight information incorporated into a statistics information, and a second communicator arranged to provide each of the mobile phones with the statistics information. Thus, the individual subjective information are gathered to form the objective statistics information.

According to a detailed feature of the invention above, the weight information is for an infant and the processor is for the care of growth of infants, and wherein the statistics information relates to the statistics growth chart of infants. Thus, the processor facilitates the individual mobile phone to effectively function as a useful electronic infant caring device.

According to another detailed feature of the invention above, the processor further comprises an authenticator of each of the mobile phones as a condition for incorporating the received weight information into the statistics information and for providing each of the mobile phones with the statistics information. Thus, the reliability of the objective statistics information is successfully increased against malicious attacks or false weight data upload.

Other features and advantages according to this invention will be readily understood from the detailed description of the preferred embodiment in conjunction with the accompanying drawings.

The detailed description of the preferred embodiment according to this invention includes various detailed features derived from the above mentioned features. However, such detailed features are not only applicable to the above mentioned features, but also are widely and independently applicable to other objects and features. So, the above description should not be deemed to limit the scope of this invention, which should be properly determined on the basis of the attached claims.

DETAILED DESCRIPTION OF THE PREFERRED EMBODIMENT

Figure 1:
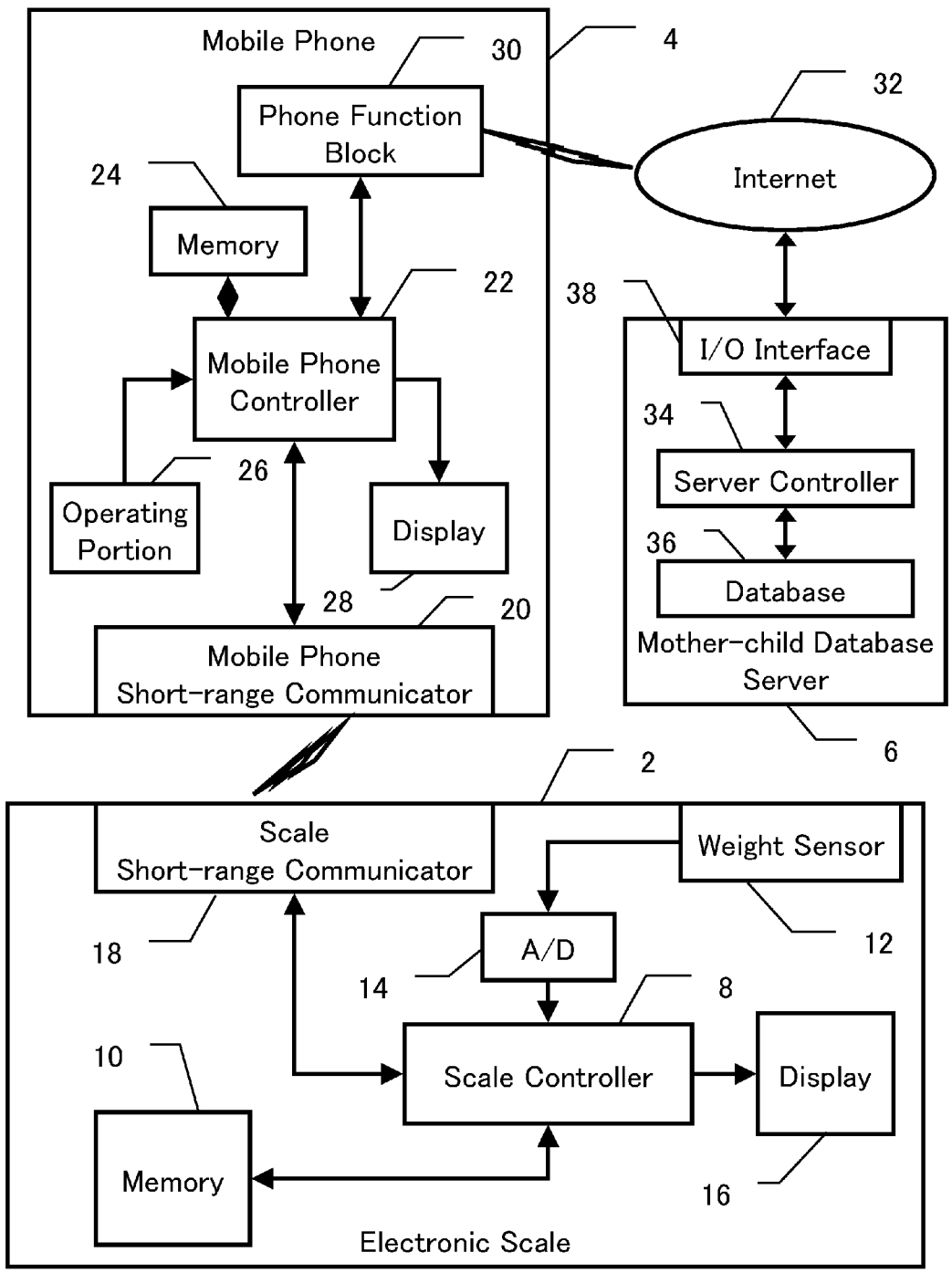
FIG. 1 is a block diagram showing a mother-child database system including a mobile phone, an electronic scale and a mother-child database server according to an embodiment of this invention.

FIG. 1 is a block diagram showing the mother-child database system according to an embodiment of this invention. The system in the embodiment includes electronic scale 2, mobile phone 4 and mother-child database server 6. Electronic scale 2 is controlled by scale controller 8 having a micro computer. Memory 10 stores computer programs for the operation of scale controller 8 and also weight data which is to be gotten by weight sensor 12 and inputted through A/D converter 14.

The basic method of measuring weights of a mother and an infant by means of electronic scale is as follows. At first, if the mother alone steps on electronic scale 2, her weight is sensed by weight sensor 12 and sent to scale controller 8 by way of A/D converter 14, which is then stored in memory 10. Next, the mother with the infant in her arms steps on electronic scale 2. And, the weight of the mother plus the infant is sensed by weight sensor 12 in this time and sent to scale controller 8. Scale controller 8 subtracts the weight of mother alone form the total weight of mother plus infant to calculate the weight of the infant alone, which is stored in memory 10. Thus, the weights of mother alone and the infant alone are measured and stored, respectively.

Weight sensor 12 for electronic scale 2 in this invention for measuring weights of mother and infant according to the basic method above preferably consists of load cells for example and is capable of functioning both in a normal region and in a high sensitivity measurement region in which the output of weight sensor 12 more sensitively changes against the change in load thereon than in the normal region. By means of this feature, electronic scale 2 covers a wide dynamic range for measurement of an adult in total with the fine measurement region for the measurement of an infant partially included. The fine measurement region, i.e., the high sensitivity measurement region both covers an assumed weight of mother alone and an assumed weight of mother plus infant so that the difference between the weights, which means the weight of infant, may be measured more precisely than in the normal region. In conformity with the fine measurement ability, the weight of infant calculated by the subtraction is stored in memory 10 with a scale interval finer than in weights measured in the normal region. Similarly, the weight of infant is displayed at display 16 with a unit finer than in weights measured in the normal region. For example, if the weight measured in the normal region is displayed in unit by 100 g, e.g., 46.8 kg, the calculated weight of infant is displayed in unit by 50 g, e.g., 3250 g.

The fine measurement region can be shifted by means of zero point adjustment of electronic scale 2. In more detail, when the weight of mother alone dips from the lower end of the fine measurement region, the zero point as the standard of sensor output is altered toward the positive side to shift the entire dynamic range in parallel toward the light weight side so that the fine measurement region may become to cover the weight of mother alone. On the other hand, when the weight of mother plus infant outweighs the upper end of the fine measurement region due to the weight of mother alone, the zero point is altered toward the negative side to shift the entire dynamic range in parallel toward the heavy weight side so that the fine measurement region may become to cover the weight of mother plus infant. Since the weight of infant alone is the relative difference between the weight of mother alone and the weight of mother plus infant, which does not depend on the weight of mother alone, the weight of infant alone can be calculated independently from the degree of zero point adjustment. However, the degree or amount of zero point adjustment should be recorded in memory 10 for the purpose of correcting the record of the weight of mother alone when the zero point adjustment is made.

The weights of mother alone and infant alone measured and stored in accordance with the above manner, is to be retrieved from memory 10 so as to be sent from scale short-range communicator 18 to mobile phone short-range communicator 20. As short-range communicators 18 and 20, wireless local area network (LAN) or infrared data communication system or the like is applicable. Mobile phone controller 22 controls memory 24 to store the weight data received from electronic scale 2. The data of infant weight is retrieved in response to the operation at operating portion 26 and displayed at display 28. The weight data on display 28 is in a form of growth chart showing the monthly change in weight of infant since its birth.

Mobile phone controller 22 having a micro computer functions in accordance with computer program stored in memory 24 to originally and mainly control the entire mobile phone 4 by means of phone function block 30 which is in connection to phone line. Operation portion 26 and display 28 are also originally and mainly arranged for the functions of mobile phone 4 carried out by phone function block 30. Operation portion 26 and display 28 are, however, advantageously utilized for displaying growth chart of infant on the basis of weight data from electronic scale 2. Memory 24 of mobile phone 4 can also store various additional data relating to the growth of infant such as body height and circumference of head. On the basis of such additional data in memory 24, display 28 can similarly show a growth chart for body height and circumference of head of infant since its birth.

Memory 24 of mobile phone 4 can further store prehistory data of expectant mother toward birthing. Various data above relating to mother and infant can be totally treated by mother-child notebook software installed in memory 24. Thus mobile phone 4 serves as electronic mother-child notebook. The mother-child notebook software is, for example, provided when an expectant mother applies for the mother-child notebook governed by a public institution. Upon provision of the mother-child notebook software, the expectant mother is informed under a strict personal information protection procedure a mother-child notebook identification number (ID) and tentative password for accessing to mother-child database server 6.

Phone function block 30 makes it possible for mobile phone 4 to communicate with mother-child database server 6 by way of internet 32 on phone line. Mother-child database server 6 including server controller 34, database 36 and Input/Output interface 38 serves as an online portal for free information service in cooperation with healthcare authority and baby item industry. Thus, mobile phone 4 with the ID and password registered can login and receive from mother-child database server 6 a growth chart software with general data of growth curves for 10 percentile and 90 percentile on the basis of the latest year statistics to see how own baby measures up against other babies in height, weight, and head size. Further, if mobile phone 4 login with the ID and password to upload under anonymity the newest weight data in memory 24 for own baby, mother-child database server 6 provides mobile phone 4 with special data of growth curves for 10 percentile and 90 percentile created by means of the statistic on the basis of the newest data currently uploaded under the same condition from a great number of mobile phones including mobile phone 4. The uploaded information is treated as anonymous weight data for the sole purpose of statistics with ID and password instantly deleted so as to strictly prevent any privacy from falling into the wrong hands. Further, for the incentive of uploading the newest anonymous weight data to increasing the reliability of statistics, a mobile phone uploading the weight data is entitled to enter into a private child-care Q&A corner provided by mother-child database server 6.

Figure 2:
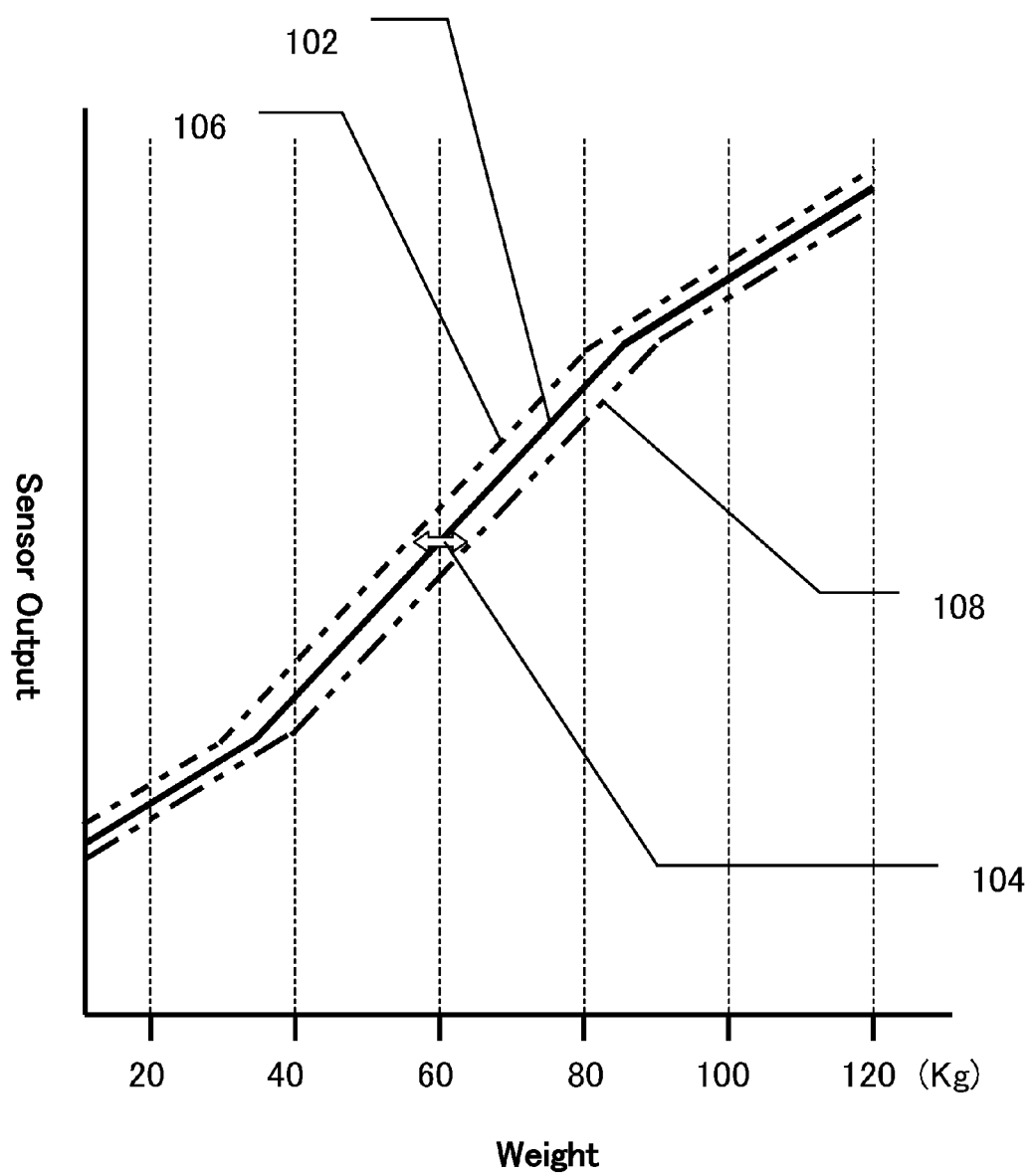
FIG. 2 is a graph showing a relationship between weight on a weight sensor and the sensor output in the electronic scale according to embodiment of this invention.

FIG. 2 is a graph showing a relationship between weight on weight sensor 12 and the sensor output with circuit compensation having been done. Curve 102 represents a standard curve with the zero point adjustment is set to the standard, curve 102 covers a range of weight form 20 kg to 120 kg. In the case of Curve 102, the high sensitivity measurement region spans from 35 kg to 85 kg, in which the change in sensor output against the change in weight on weight sensor 12 is greater than that in the normal regions on both side of the high sensitivity measurement region. Thus, a measurement in wide dynamic range in total from 20 kg to 120 kg as well as fine measurement with a finer scale interval in the partial range from 35 kg to 85 kg is possible.

Curve 102 can be shifted in parallel along a horizontal direction denoted by white allow 104 to shift the high sensitivity region toward the lighter weight side or the heavier weight side. Curve 106 represents a case that curve 102 is shifted toward the lighter weight side by means of shifting zero point toward the plus side, in which the high sensitivity region comes to span from 30 kg to 80 kg. On the other hand, curve 108 represents a case that curve 102 is shifted toward the heavier weight side by means of shifting zero point toward the minus side, in which the high sensitivity region comes to span from 40 kg to 90 kg. The width and the gradient of the high sensitivity region can be suitably determined with the condition of designing weight sensor 12, the requirement for the accuracy of measurement, the variability of expected weight of users and the adjustable range of zero point taken into consideration. If electronic scale 2 is not necessarily designed to make it freely available to the general public, but is designed only for use by a group of specifically assumed users such as in semi-custom design, the width of the high sensitivity region may be relatively narrow and also the zero point adjustment may be unnecessary. Further, in such a more simplified case that the dynamic range in total can be narrow due to a very limited user(s) assumed, the entire dynamic range may be designed as the high sensitivity region and mere the scale interval for displaying the weight of the infant is changed to be finer than in the case of displaying the weight of the mother.

Figure 3:
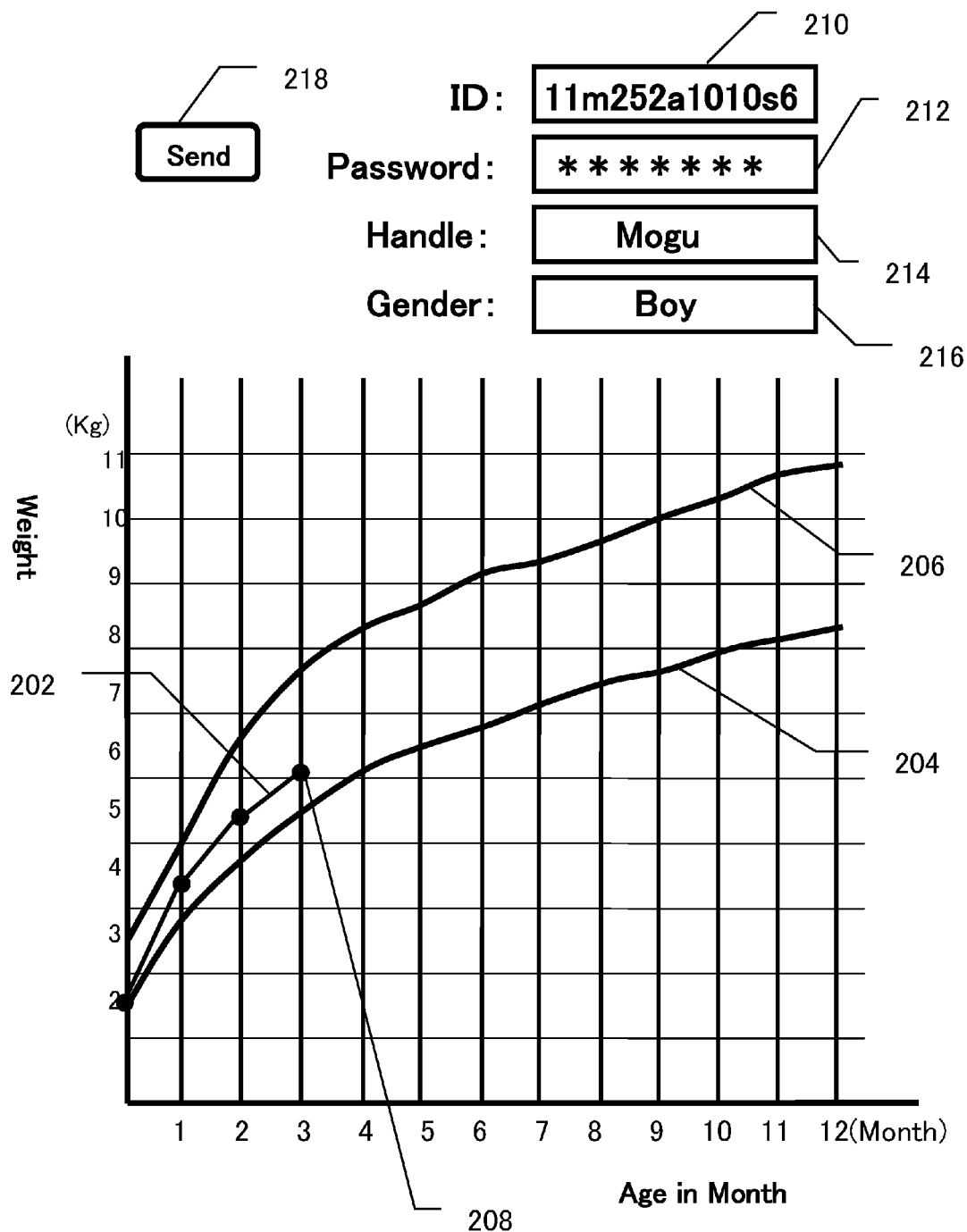
FIG. 3 is an example of display with the mobile phone functioning as an electronic mother-child notebook, in which a weight growth chart is displayed.

FIG. 3 is an example of display with mobile phone 4 functioning as electronic mother-child notebook, in which a weight growth chart is displayed. The weight growth chart is processed by mother-child notebook software downloaded from mother-child database server 6 upon access with ID and password and installed in memory 24. The weight growth chart shows growth curve 202 which is created by automatically plotting the history of growth in weight stored in memory 24 on the graph of age in month vs. weight and automatically connecting the plots. Since the process of creating curve 202 is carried out by mobile phone controller 22 within mobile phone 4, data retrieved from memory 24 for plotting the graph does not leak from mobile phone 4.

In FIG. 3, the newest statistical both growth curve 204 representative of 10 percentile and the newest statistical growth curve 206 representative of 90 percentile are displayed. Data for displaying statistical growth curves 204 and 206 are provided from mother-child database server 6 in response to such a series of operations at mobile phone 4 that ID box 210, password box 212, handle box 214 and gender box 216 are all filled and send button 218 is operated by means of operating portion 26 to access mother-child database server 6 and upload the newest weight data corresponding to plot 208 on the graph.

Alternatively, the user can simply make an operation to display growth chart by means of operating portion 26 if the user would not desire to send the newest weight data corresponding to plot 208 to mother-child database server 6 for the reason of privacy protection. And, general data of growth curves 204 and 206 for 10 percentile and 90 percentile on the basis of the latest year statistics, which has been downloaded with the growth chart software upon the initial register with the ID and password, is displayed on display 28 with growth curve 202 on the basis of data stored in memory 24 displayed in comparison with general growth curves 204 and 206. Thus, the display of growth chart at display 8 as shown in FIG. 3 can be made without any communication with mother-child database server 6 on the occasion of displaying the newest weight data corresponding to plot 208 on the graph.

Figure 4:
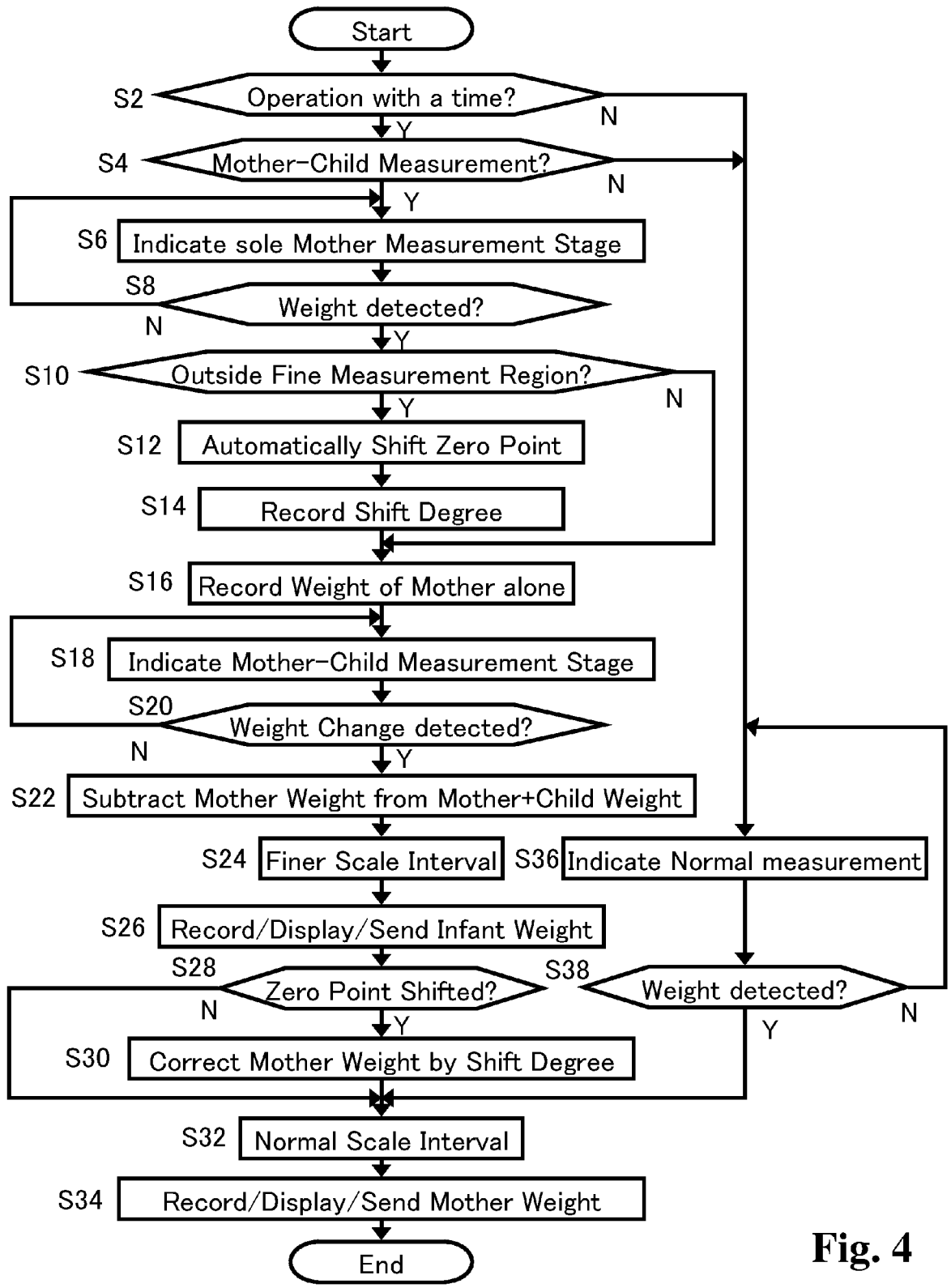
FIG. 4 is a flowchart showing the function carried out by a scale controller of the electronic scale in FIG. 1.

FIG. 4 is a flowchart showing the function carried out by scale controller 8 of electronic scale 2 in FIG. 1. The flowchart starts when electronic scale 2 is powered on, and it is checked in step S2 whether or not any operation relating measurement is done within a predetermined time from the power on of electronic scale 2. If the operation is detected in step 2, the flow goes to step S4 to check whether or not the operation is for mother-child measurement. If it is the case of mother-child measurement operation, the flow goes to step S6 to indicate on display 16 that the stage is for measuring mother's weight on her own, the flow then going to step S8. In step S8, it is checked whether or not weight sensor 12 detects any weight to return to step S6 upon no detection. Thus, steps S6 and S8 are repeated to wait a detection of weight with the indication of the mother measurement stage continued.

If it is determined in step S8 that weight sensor 12 detects some weight, the flow goes to step S10 to check whether or not the detected weight of mother alone is outside the high sensitivity measurement region, or the fine measurement region. As has been mentioned, the case of mother's weight outside the fine measurement region corresponds to a first situation that the weight of mother alone dips from the lower end of the fine measurement region or a second situation that the weight of mother plus a supposed infant is expected to outweigh the upper end of the fine measurement region due to the weight of mother alone. If it is determined in step S10 that mother's weight is outside the fine measurement region, the flow goes to step S12 to alter the zero point to shift the entire dynamic range in parallel so that the fine measurement region may become to cover both the weight of mother alone and the weight of mother plus a supposed infant. The degree or amount of the shift is recorded is step S14, the flow going to step 16. On the other hand, if it is not determined in step S10 that mother's weight is outside the fine measurement region, the flow directly goes to step S16, any zero point shift being not made in this case.

In step S16, the weight of mother alone measured in accordance with the process above is recorded in memory 10. Next in step S18 it is indicated at display 16 that the stage is advanced for measuring weight of mother plus infant, the flow then going to step S20. In step S20, it is checked whether or not weight sensor 12 detects any change in weight due to the infant taken in mother's arms to return to step S6 upon no detection. Thus, steps S18 and S20 are repeated to wait a detection of change in weight with the indication of the mother-child measurement stage continued. Step 20 can detect the change both in a first case that mother takes over infant with herself kept on electric scale 2 and in a second case that mother once got off electronic scale 2 and steps thereon again with infant in her arms by means of the comparison with the weight of mother alone having been recorded in step S16.

If it is determined in step S20 that weight sensor 12 detects some change in weight, the flow goes to step S22 to calculate the weight of infant alone by means of subtracting the weight of mother alone recorded in step S16 from the weight of mother plus infant detected in step S20. Practically, the weight of mother plus infant detected in step S20 may be once recorded in memory 24 or a register, and the subtraction calculation in step S20 is carried out between the weight of mother alone and the weight of mother plus infant both retrieved from memory 24 or the register. Here, it should be noted that the weight of mother plus infant used in calculation in step S22 is the weight measured with zero point shifted if the zero point shift has been made in step S12, the amount of zero point shift in the measurement in step S20 for the weight of mother plus infant in this case being identical with that in the record in step 16 for the weight of mother alone, which are exactly cancelled through the subtraction in step S22. Next in step S24, the finer scale interval is adopted to record the infant weight in memory 10 and display it at display 16 in step S26. Further in step S26, the infant weight stored in memory 10 is automatically sent to mobile phone 4 by way of scale short-range communicator 18 and mobile phone short-range communicator 20. As long as the process of steps S16 to S26 above for treating the weight of infant, the process is not to do with whether or not zero point shift is carried out in step S12.

In contrast the above, the process led by step S28 for treating the weight of mother closely depend on the fact whether or not zero point shift is carried out in step S12. So, it is checked in step S28 whether or not the zero point adjustment has been made in step S12. If it is determined in step S28 that the zero point shift has been made in step S12, the flow goes to step S30 to correct the weight of mother alone recorded in step 16 by the shift degree recorded in step S14, the flow then going to step S32. On the other hand, if it is not determined in step S28 that the zero point shift has been made in step S12, the flow directly goes to step S32, because any correction is naturally unnecessary in this case. In step S32, the normal scale interval is adopted in place of the finer scale interval to record the mother weight in memory 10 and display it at display 16 in step S34. Further in step S 34, the mother weight stored in memory 10 is automatically sent to mobile phone 4 by way of scale short-range communicator 18 and mobile phone short-range communicator 20, the flow then going to the end. The mother weight sent to mobile phone 4 is processed to diagnose whether or not the mother is doing well after childbirth by means of the mother-child notebook software.

By the way, if it is not determined in step S2 that any operation relating measurement is done within a predetermined time from the power on of electronic scale 2, the flow goes to step S36 to indicate on display 28 that electronic scale 2 is automatically set into normal measurement status. Similarly, if it is determined that the operation made within the predetermined time is not for mother-child measurement, the flow goes to step S36 for normal measurement. Next in step S38, it is checked whether or not weight sensor 12 detects any weight to return to step S36 upon no detection. Thus, steps S36 and S38 are repeated to wait a detection of weight with the indication of the normal measurement status continued. If it is determined in step S38 that weight sensor 12 detects some weight, the flow goes to step S32 to adopt the normal scale interval and to record the weight in memory 10, to display it at display 16 and to send it to mobile phone 4 in step S34, the flow then going to the end also in such a normal measurement case. In the above explanation, it is the mother who measures her weight in the normal measurement case. However, not only the mother, but also any person such as another member of the family can measure its weight in the normal measurement case. So, with respect to the normal measurement case, it should be noted that step S34 is understood to read "Record/Display/Send weight of a person" or the like.

Figure 5:
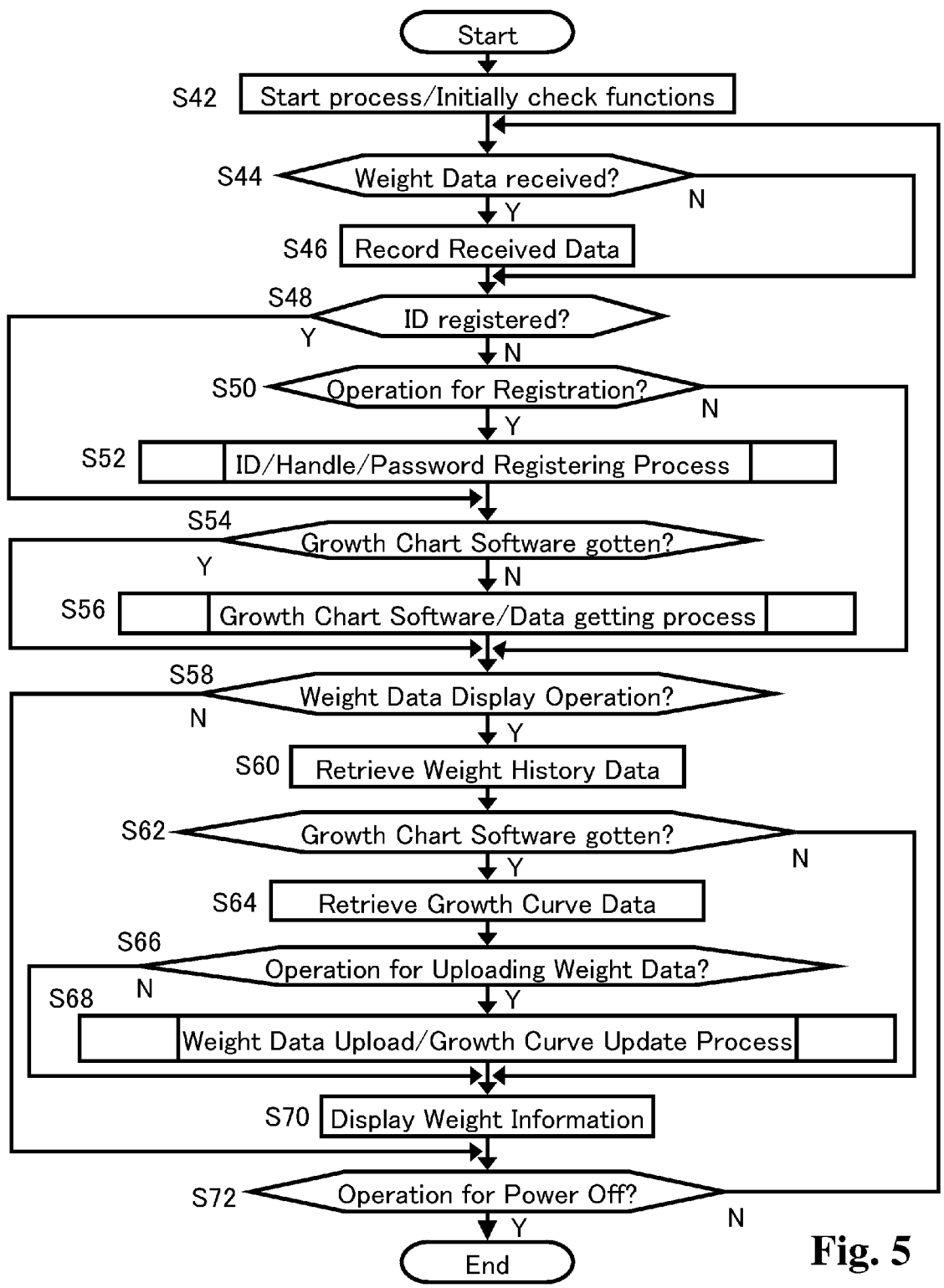
FIG. 5 is a flowchart showing a partial function carried out by a mobile phone controller of the mobile phone in FIG. 1 in relation with a mother-child notebook software.

FIG. 5 is a flowchart showing a partial function carried out by mobile phone controller 22 of mobile phone 4 in FIG. 1 in relation with mother-child notebook software. The flowchart starts when mobile phone 4 is powered on to go to step S42, in which it is directed to start process and to initially check various functions of mobile phone 4. Next, in step S44, it is checked whether or not any new weight data is received from electronic scale 2. If it is the case, the flow goes to step S46 to record the weight data into memory 24, the flow the going to step S48. On the other hand, if it is not determined that any new weight data is received from electronic scale 2, the flow directly goes to step S48.

In step S48, it is checked whether or not the mother-child notebook ID has been registered. As has been mentioned, the mother can be informed of the ID upon provision of the mother-child notebook software under a strict personal information protection procedure. This is not only for protecting privacy of mother and child, but also for increasing the reliability of statistics by mother-child database server 6 against malicious attacks or false weight data upload. The registration of the ID is at mother's option.

If it is determined in step S48 that the mother-child notebook ID has not been registered, the flow goes to step S50 to check whether or not an operation for registering ID at operation portion 26 is made. If such an operation is detected in step S50, the flow goes to step S52 for accessing mother-child database server 6 to carry out a series of registration process in accordance with instructions by mother-child database server 6, the flow then going to step S54. The process carried out in step S52 includes authentication of the ID and the tentative password for initial entry into mother-child database server 6 and the registration of ID, the handle and the formal password in preparation for the next access. On the other hand, if it is determined in step S48 that the mother-child notebook ID has already been registered in mother-child database server 6, the flow directly goes to step S54.

In step S54, it is checked whether or not the growth chart software has been gotten. If not, the flow goes to step S56 for accessing mother-child database server 6 to download and install the growth chart software with general data of growth curves for 10 percentile and 90 percentile on the basis of the latest year statistics, which is necessary for mobile phone 4 to make display as in FIG. 3, the flow then going to step S58. On the other hand, if it is determined in step S54 that the growth chart software has been gotten, the flow directly goes to step S58. Further, if it is not determined in step S50 that the operation for registering ID is made, the flow directly goes to step S58.

In step S58, it is checked whether or not an operation for displaying weight data is made at operation portion 26. If such an operation is detected in step S58, the flow goes to step S60 to retrieve weight history data from memory 24. And, in step S62, it is checked whether or not the growth chart software has been gotten. If it is the case, the flow goes to step S64 to retrieve the data of growth curves for 10 percentile and 90 percentile from memory 24. Further, it is checked in step S66 whether or not an operation is made at operation portion 26 to upload the private infant weight data in memory 24 to mother-child database server 6. If such an operation is detected in step S66, the flow goes to step S68 for accessing mother-child database server 6 to upload the private infant weight data and, in exchange for it, to download the data of updated growth curves for 10 percentile and 90 percentile with the uploaded data incorporated for updating memory 24, the flow going to step S70. The above mentioned process in step 68 corresponds to the explanation in conjugation with FIG. 3.

On the other hand, if it is not determined in step S66 that the operation to upload the private infant weight data, the flow directly goes to step S70. Further, if it is not determined in step S62 that the growth chart software has been gotten, the flow directly goes to step S70. In step S70, weight information in accordance with the previous steps is displayed. In other words, if step S70 is reached by way of step S68, growth chart as in FIG. 3 is displayed with the statistics growth curves 204 and 206 for 10 percentile and 90 percentile displayed with personal growth curve 202 being of the updated ones. On the other hand, if step S70 is reached directly from step S66, the statistics growth curves 204 and 206 in growth chart in FIG. 3 are on the basis of the latest year statistics. Further, if step S70 is reached directly from step S62, only personal growth curve 202 with weight data stored in memory 24 simply plotted is displayed.

The display by the function of step S70 is automatically continued until a predetermined time has lapsed. With the automatic termination of the display, the flow goes to step S72 to check whether or not an operation is made at operation portion 26 to turn off the power supply to mobile phone 4. If such an operation is detected in step S72, the flow goes to the end. Further, if it is not determined in step S58 that the operation for displaying weight data is made at operation portion 26, the flow goes to step S 72 for checking the power off operation. If the power off operation is not detected in step S72, the flow returns to step S44 to repeat steps S44 to S72 unless the power off operation is detected in step S72.

Figure 6:
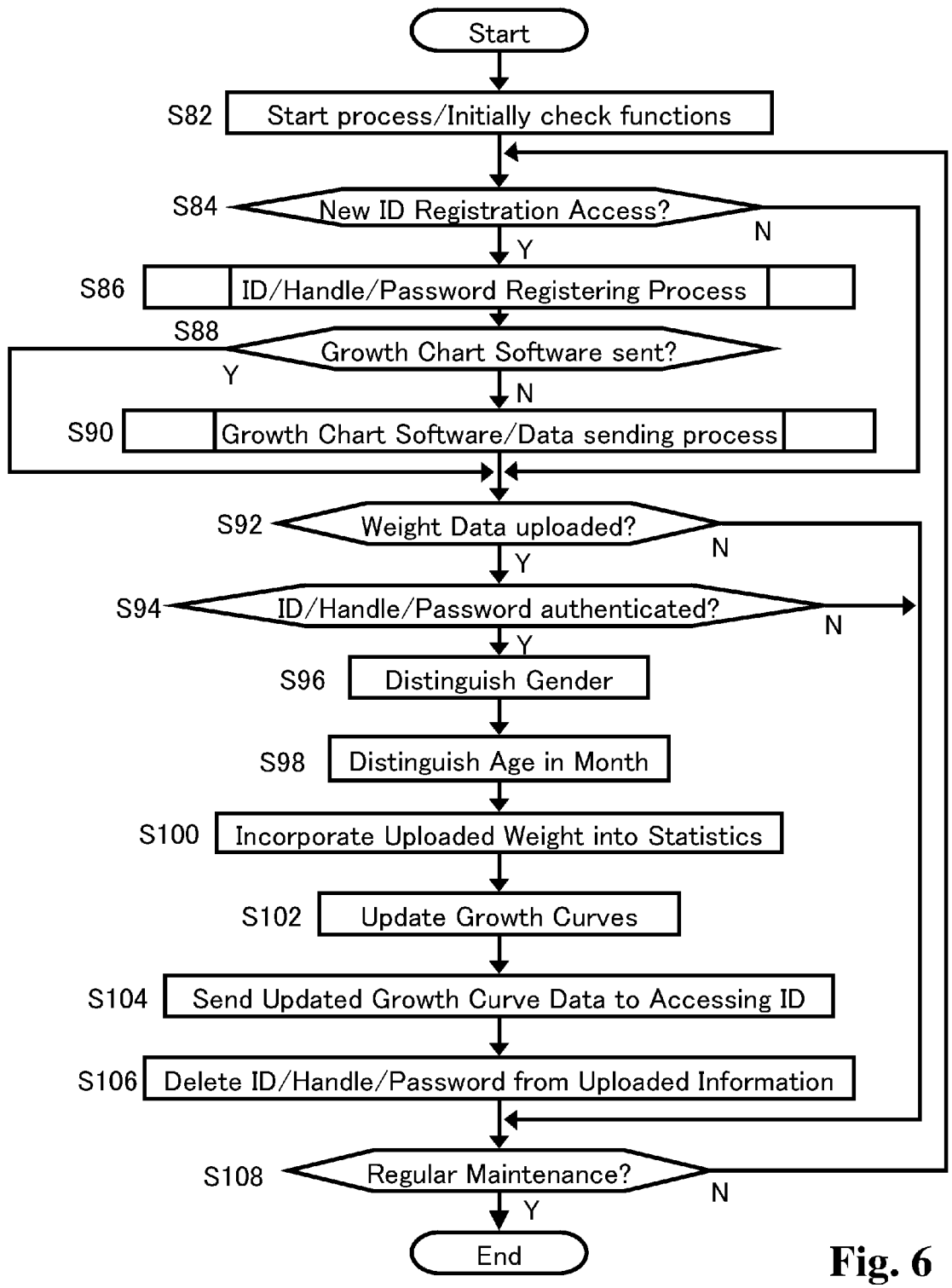
FIG. 6 is a flowchart showing the mother-child notebook software function carried out by a server controller of the mother-child database server in FIG. 1.

FIG. 6 is a flowchart showing the mother-child notebook software function carried out by server controller 34 in FIG. 1. The flowchart starts when server controller 34 is started up to go to step S82, in which it is directed to start process and to initially check various functions of mother-child database server 6. Next, in step S84, it is checked whether or not any new access for ID registration on the mother-child notebook system. If the access is detected in step 84, the flow goes to step S86, in which a series of registration process is carried out in communication with mobile phone 4 accessing to mother-child database server 6, the flow then going to step S54. The process carried out in step S86 includes authentication of the ID and the tentative password from the accessing mobile phone 4 and the registration of ID, the handle and the formal password in preparation for the next access.

Next in step S88, it is checked whether or not the growth chart software has been sent to the accessing mobile phone 4. If not, the flow goes to step S90 for sending to mobile phone 4 the growth chart software with general data of growth curves for 10 percentile and 90 percentile on the basis of the latest year statistics, the flow then going to step 92. On the other hand, if it is determined in step S88 that the growth chart software has been sent, the flow directly goes to step S92. Further, if the new ID registration access operation is not detected step S84, the flow directly goes to step S92.

The steps led by step S92 are for updating the statistics of growth curves for 10 percentile and 90 percentile with an uploaded new weight data incorporated. In step S92 it is checked whether or not a new weight data is uploaded. If a new data upload is detected in step S92, the flow goes to step S94 to authenticate ID, handle and password for fear of malicious attacks or false weight data upload. If the authentication is successful in step S94, the gender of the infant is distinguished in step S96, and the age in month of the infant in step S98 to incorporate the uploaded weight data of the infant into the statistics of growth chart based on gender and age in month in step S100. By means of the preceding steps, the growth curves for one of the genders corresponding to that of the infant is updated in step S102. Thus, the updating of is carried out every time when new weight data is uploaded in the case of the flowchart of FIG. 6. However, in place of such a real time update, the update step such as step 102 may be carried out every 24 hours in a lump sum of data accumulated for one day.

Next in step 104, the updated data of growth curves is sent to ID authenticated in step S94. Further in step S106, private information related to the weight data uploaded, such as ID, handle and password, are deleted for keep the privacy of mother and infant, the flow then going to step S108. On the other hand, if no upload of new weight date is detected in step S92, the flow directly goes to step S108. Also, the authentication is failed in step S94, the flow goes to step S108. In step S108 it is checked whether or not it is the time for regular maintenance of mother-child data base server 6 to go to the end if it is the case. On the other hand, if it is determined in step 108 that the regular maintenance time has not come, the flow goes back to step S84 to repeat steps S84 to step S108 till the regular maintenance time comes.

The various features set forth above are not limited to the application to the explained embodiment, but is widely applicable to other embodiments. For example, the features relating to the electronic mother-child notebook are advantageous not only in combination with electronic scale 2 of the embodiment which measures mother and infant weight, but also in combination with a general scale for sole purpose of measuring infant weight. Further, in place of the embodiment, in which electronic scale 2 is separated from mobile phone 4, all functions relating to the electronic mother-child notebook are incorporated into electronic scale 2 so as to form an integrated electronic scale having electronic mother-child note book functions. In this case, electronic scale directly communicates with mother-child database 6. By the way, the features of electronic scale 2 in the embodiment are advantageous not only in measuring the weight of mother and infant, but also in measuring the weight of a pet animal in such a manner that the animal guardian steps on electronic scale with the hyperactive pet animal held in his or her arms. Further, the features of electronic scale 2 in the embodiment are advantageous in knowing the difference in weight of the same person in a finer scale interval which may change as a result of diet plan. Thus, the features according to this invention are applicable to a processor for care of weight change in general, including the growth of child, the weight control of a pet and the diet plan.

What is claimed is:

1. An electronic scale for measuring a weight comprising:
a weight sensor arranged to measure a weight of a load on the weight sensor for producing a measurement output, wherein the weight sensor is arranged to function in three continuous measurement ranges including a first range for covering a lighter weight region with a normal sensitivity, a second range for covering a middle weight region with high sensitivity in which the output of the weight sensor more sensitively changes against the change in the load thereon than in the first range of the normal sensitivity, and a third range for covering a heavier weight region with a normal sensitivity equal to that of the first range;
a memory arranged to store a first measurement output produced by the weight sensor;
a controller arranged to calculate a difference weight between the first measurement output and a second measurement output produced by the weight sensor; and
a display arranged to display a measurement output with a first scale interval and to display the difference weight with a second scale interval finer than the first scale interval,
wherein the first and second measurement outputs are produced in the second range of the high sensitivity for the display of the difference weight with the second scale interval and
wherein the weight sensor is so arranged that the second range of the high sensitivity is capable of being shifted to cover both the first and second measurement outputs.

2. The electronic scale according to claim 1, wherein the weight sensor is so arranged that the high sensitivity measurement region is automatically shifted in response to the measurement output.

3. The electronic scale according to claim 1, wherein the memory is arranged to store the degree of shift of the second range of the high sensitivity to correct the first measurement output into an absolute weight which is free from the shift of the high sensitivity measurement region.

4. The electronic scale according to claim 1, wherein one of the first and second measurement outputs is for the weight of a mother alone, the other of the first and second measurement outputs is for the weight of the mother with an infant in her arms, and the difference weight is for the infant alone, whereby the weight in a finer unit for the infant alone is displayed in the second scale interval finer than the first scale interval for an adult.

5. The electronic scale according to claim 1 further comprising a processor for the care of weight change.

6. The electronic scale according to claim 5, wherein the processor is for the care of growth of an infant.

7. The electronic scale according to claim 1 further comprising a communicator arranged to transmit the measured weight information to an outside processor for the care of weight change.

8. The electronic scale according to claim 7, wherein the outside processor is a mobile phone.

9. The electronic scale according to claim 7, wherein the outside processor is a database arranged to provide statistics information for the care of weight change.

10. A processor of a mobile phone for the care of weight change in cooperation with an electronic scale for measuring a weight comprising:
- a first communicator arranged to receive weight information from the electronic scale;
- a second communicator arranged to receive statistics of weight information based on a number of other mobile phones unknown to a user of the mobile phone for the care of weight change from an outside database receiving the weight information of the number of mobile phones under anonymity each other;
- a memory arranged to store the weight information received by the first communicator and the statistics of weight information received by the second communicator;
- a display arranged to retrieve the weight information and the statistics of weight information from the memory for displaying them in a comparative manner; and
- a third communicator arranged to transmit the weight information to the outside database to participate in the statistics,
- wherein the transmitted weight information is incorporated into the statistics information received from the outside database so that the statistics of weight information is based on the mobile phone and the number of other mobile phones unknown to the user of the mobile phone.

11. The processor according to claim 10, wherein the processor is a mobile phone.

12. The processor according to claim 10, wherein the weight information is for an infant and the outside database is for the care of growth of infants, and wherein the display is arranged to display the weight information and the statistics of weight information in the form of comparative growth curves in the growth chart.

13. The processor according to claim 10, wherein the processor is a mobile phone, and wherein the second and third communicators are the phone line.

14. A processor for the care of weight change with a database in cooperation with a number of mobile phones comprising:
- a first communicator arranged to receive weight information from the number of the mobile phones under anonymity each other;
- a memory arranged to store the weight information received from the number of mobile phones by the first communicator;
- a processing unit arranged to process the weight information in the memory so as to incorporate the weight information received from the number of mobile phones into a statistics information under anonymity; and
- a second communicator arranged to provide each of the mobile phones with the same statistics information, respectively, under anonymity each other.

15. The processor according to claim 14, wherein the weight information is for an infant and the processor is for the care of growth of infants, and wherein the statistics information relates to the statistics growth chart of infants.

16. The processor according to claim 14 further comprising an authenticator of each of the mobile phones as a condition for incorporating the received weight information into the statistics information and for providing each of the mobile phones with the statistics information.

17. The processor according to claim 10 further comprising an authenticator arranged to authenticate the processor as a condition for the transmitted weight information to be incorporated into the statistics information.

18. The electronic scale according to claim 1, wherein the weight sensor is so arranged that the high sensitivity measurement region is shifted to cover the first and second measurement outputs with the two sub-regions of the normal sensitivity measurement region kept on both sides of the high sensitivity measurement region, respectively.

* * * * *